Sept. 9, 1969   H. C. BANAS ET AL   3,465,991
JETESCAPE EVACUATION SYSTEM
Filed Nov. 30, 1967
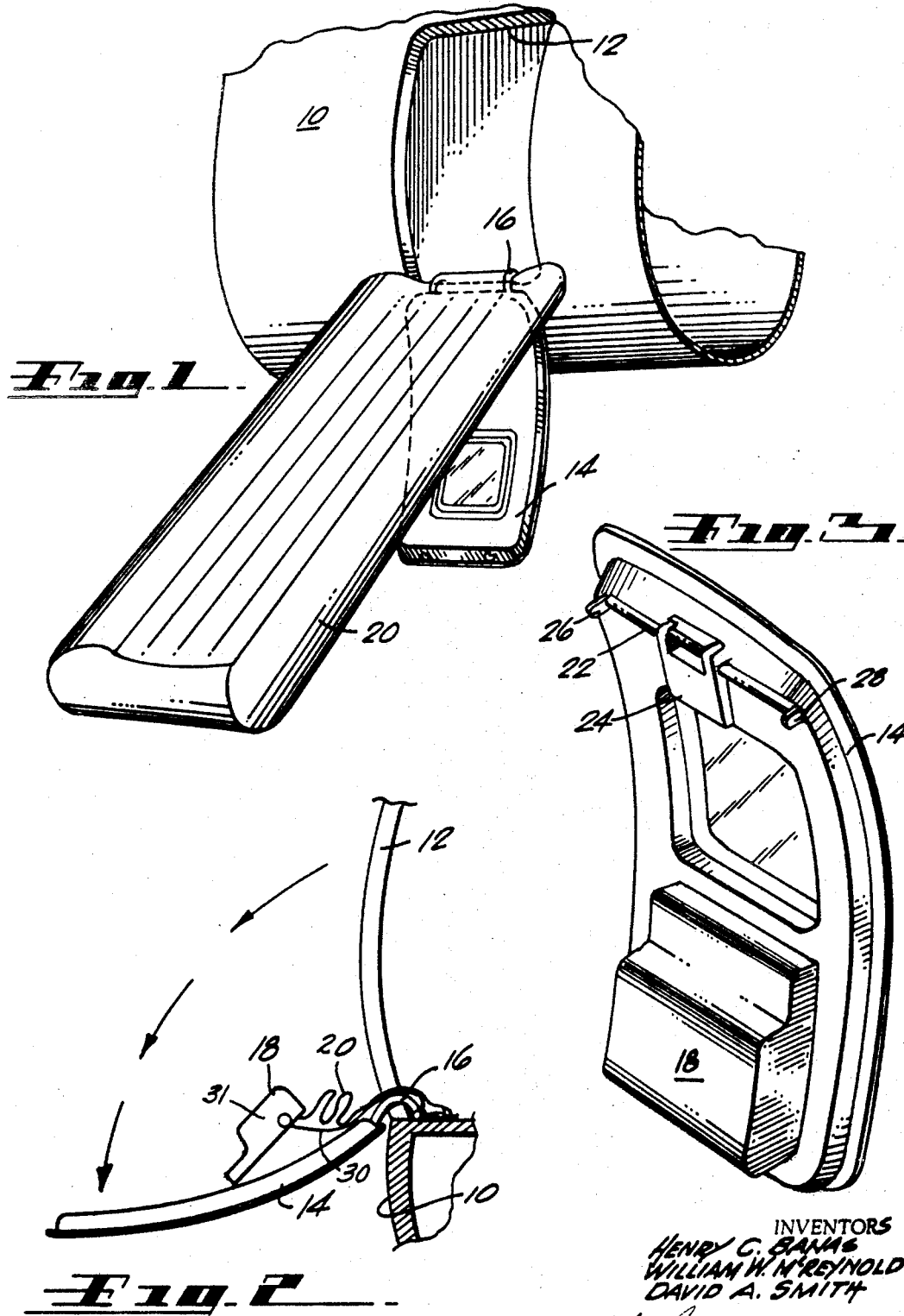
INVENTORS
HENRY C. BANAS
WILLIAM W. McREYNOLDS
DAVID A. SMITH
BY Jack E. Munro
— AGENT —

United States Patent Office 3,465,991
Patented Sept. 9, 1969

3,465,991
JETESCAPE EVACUATION SYSTEM
Henry C. Banas, Costa Mesa, William W. McReynolds, Lakewood, and David A. Smith, Long Beach, Calif., assignors to McDonnell Douglas Corporation, a corporation of Maryland
Filed Nov. 30, 1967, Ser. No. 686,922
Int. Cl. B64c 25/08
U.S. Cl. 244—137                                1 Claim

ABSTRACT OF THE DISCLOSURE

A method and apparatus for emergency evacuation of vehicle passengers wherein the door to the vehicle opens downwardly and initiates the opening of a passenger egress slide.

Background of the invention

The apparatus of this invention has been found to be specially suitable for use in aircraft and more specifically usable upon an aircraft having made a forced landing. Under such a condition the normal boarding ladder or stairways are not available and some form of passenger escape apparatus must be available in the plane. Although the apparatus of this invention is being described for use in conjunction with aircraft it is to be understood that this invention could be employed where other similar conditions are encountered.

An emergency evacuation slide has heretofore been used in aircraft as usually the aircraft will come to rest in an unconventional position. For example, in the event of the collapse of one of the landing wheels either the tail or nose portion of the plane will come to rest at a greater than normal distance from the ground. Passengers seeking to escape from the plane will therefore experience considerable difficulty and possible injury if they leave the craft by jumping from a door or hatch in the elevated part of the plane. The height of the escape hatch or door from the ground will vary depending upon the type of plane and character of the accident. For example, in certain aircraft presently in use and particularly the Douglas DC-8 or the Boeing 707, the fore and aft doors are normally approximately 12 and 10 feet from the ground respectively. However, in the event of a front wheel collapse, for example, the rear door of the DC-8 may be more than 17 feet from the ground and the front door may be 7 or more feet from the ground. Since these aircraft carry an excess of 100 passengers and since safety regulations require that all the passengers must be removed in the shortest possible period of time, it is apparent that the doors and the escape hatches including those farthest from the ground must be utilized. Therefore, each door is provided with an escape chute designed to operate efficiently, effectually, and satisfactorily regardless of the height of the door from the ground and or the angle of the chute to the ground.

It is to be understood that the apparatus of this invention is not confined to any specific construction of escape slide. Several types of inflatable escape slides are known. Each is readily usable with applicants' invention. However, the type of slide which can be deployed in the shortest possible time will be at best advantage. The apparatus of applicants' invention is to facilitate deployment of this escape slide in the shortest possible time.

Quite frequently when an aircraft makes an emergency or crash landing there is always the danger that the fuel may ignite and/or explode at any time thereafter. It is therefore desirable that means be provided to evacuate the passengers and crew in the shortest possible time. In the most efficient present system the shortest time from initiation of the system to complete deployment of the evacuation slide is approximately thirteen seconds. This system employs the use of an evacuation slide mounted in a container upon the interior side of the emergency opening door with the door being a normal side opening door. To activate this system a person need only to pull a lever which unlocks the door and push the door to the open position which thereupon causes removal of the slide from the container which automatically activates the apparatus to inflate the side permitting passenger use.

Summary of the invention

Basically the method and apparatus of this invention is to completely deploy the escape slide in a time interval of approximately eight seconds from the initiation of the deployment procedure. Specifically, the apparatus of this invention is to mount a conventional escape slide in combination with a downwardly opening door. The door of applicants' invention, upon being unlatched, will fall open by gravity instead of requiring a manual opening force. Upon the opening of the door the inflation procedure for the escape slide is initiated and thereupon automatically and subsequently deployed. The escape slide which is used in conjunction with applicants' invention can be of any conventional construction. However, because of the particular deployment procedure it is to be understood that the slide must be folded within its container in a particular manner to permit quick deployment of the slide. The manner in which the slide is folded is different in applicants' invention from the manner of folding in the conventional side-hinged door.

It is felt from the foregoing that the objects of this invention have been defined sufficiently so as to not warrent specific enumeration. However, further objects and advantages of the invention will become apparent from the following specification taken in conjunction with the accompanying drawing.

Brief description of the drawing

FIGURE 1 shows the escape system of applicants' invention as employed with a downwardly opening door of an aircraft fuselage;

FIGURE 2 is a side view of the apparatus of applicants' invention after activation of the system but prior to complete deployment of the escape slide; and FIGURE 3 is a perspective view of the interior of the door, showing the apparatus of applicants' invention as it would be installed within the aircraft fuselage.

Description of the shown embodiment

Referring specifically to the drawing there is shown in FIGURE 1 an aircraft fuselage 10 having an opening 12 therein, opening 12 being of sufficient size to permit exit of a person. Door 14 is to interlock within opening 12 in an airtight manner. As can be seen from the drawing door 14 is not a conventional side opening type door but it is a downwardly opening door through the bottom hinge connection 16.

Mounted on the interior side of the door 14 is a container 18 which is to confine the passenger evacuation slide 20 in its deflated state. Container 18 is removably fixed to the door 14 so as to permit withdrawal of the slide 20 therefrom upon activation of the emergency evacuation system. Slide 20 includes a non-inflatable webbing member, as shown in FIG. 2, attaching container 18 to the aircraft fuselage. Door 14 is latched to the aircraft fuselage through latching system 22 which includes handle 24. Latching system 22 includes two spaced latches 26 and 28 which securely retain the door 14 within the opening 12 on each side thereof.

The operation of applicants' invention is as follows: Upon rotation of the handle 24 and unlatching of the latches 26 and 28 of the door 14, the door begins to fall outwardly and downwardly by means of gravity. Door 14 only need move a short distance from the aircraft fuselage 10 at which time the container 18 is removed from the door by means of a lanyard 30 one end of which is permanently affixed to the aircraft fuselage 10. Lanyard 30 also activates the inflation mechanism 31 of the slide 20 and at that time the slide begins to be inflated. Noting FIGURE 2, the removal of the container 18 from the door 14 is shown but with the evacuation slide 20 still contained therein. However, in an instance of time later the inflation procedure of the slide 20 will force complete removal of the container 18 from the slide 20 and permit the complete deployment of the slide 20 as shown in FIGURE 1.

Although this invention is described as an inflatable escape slide assembly for facilitating the safe escape of persons from an aircraft, it is obvious that this invention is susceptible to being used in different environments calling for such an emergency evacuation system.

We claim:
1. In combination with a door to an enclosure, said door having at least a lower edge and an upper edge, said lower edge being hinged with respect to said upper edge, whereby said door openings by said upper edge rotating with respect to said lower edge, the improvement comprising:
   an inflatable evacuation slide having a main body portion, first and second end portions, said first end portion being secured to said enclosure;
   a container for containing said main slide body portion, said container being removably connected to the interior of said door; and
   a lanyard having first and second end portions, said first lanyard end portion being fixedly secured to said enclosure and said second lanyard end portion being secured to an inflation mechanism for inflating said inflatable slide, whereby upon the unlatching and opening of said door, said lanyard automatically removes said container from said door, and actuates said inflation mechanism causing inflation of said slide and withdrawal of said slide from said container, upon inflation said slide extends adjacent to the surface which supports said enclosure to permit substantially safe and quick removal of objects from said enclosure.

References Cited
UNITED STATES PATENTS

| | | | |
|---|---|---|---|
| 2,558,975 | 7/1951 | Moreno et al. | 244—129 |
| 2,936,056 | 5/1960 | Heyniger | 244—137 X |
| 3,102,623 | 9/1963 | Schacht et al. | 244—137 X |
| 1,798,430 | 3/1931 | Markus | 9—316 |
| 2,765,131 | 10/1956 | Boyle | 244—137 |
| 3,018,867 | 1/1962 | Heyniger | 244—137 |

MILTON BUCHLER, Primary Examiner

THOMAS W. BUCKMAN, Assistant Examiner

U.S. Cl. X.R.

182—48; 193—25; 244—129